Patented July 27, 1943

2,325,385

UNITED STATES PATENT OFFICE 2,325,385

LATEX IMPREGNATION

Earl K. Fischer, Long Island City, N. Y., assignor to Interchemical Corporation, New York, N. Y., a corporation of Ohio No Drawing. Application April 10, 1942, Serial No. 438,441

3 Claims. (Cl. 117—163)

This invention relates to the impregnation of paper, fabric, felt and the like with rubber latex, and is directed to an improvement which aims to provide a uniform rate of impregnation as a bath of impregnating fluid is being utilized.

It has been observed, in the impregnation of fibrous materials with latex, where a bath of latex is maintained and the fibrous material is allowed to absorb latex from the bath, or has the latex forced through it, that uniform results are not obtained as to impregnation. Use of baths of minimum latex content, with constant replenishment, has been suggested as a solution for the problem; and many impregnation methods have been devised which treat the fibrous material to be impregnated with only the desired amount of latex.

It is often desirable to dilute natural latices to reduce the absorption of rubber by the material to be impregnated. When a latex saturating bath is diluted with water and ammonia, additional stabilizing agents (protective colloids) are necessary. Casein, glue, starch, agar, water-soluble gums, and soaps are examples of commonly used stabilizers. The addition of such materials, while unobjectionable for some purposes, frequently increases the viscosity of the bath, thereby complicating the mechanical saturation operation, and tending to give a finished product which is undesirably stiff or "boardy."

I have discovered that absorbent materials being treated with latex absorb from the latex bath the rubber and the non-rubbery components of the latex, but that the non-rubbery components are absorbed at a much faster rate, and that uniform impregnation can be obtained from a latex bath by replenishing the bath from time to time with sufficient latex serum, or equivalent, to maintain the original ratio of rubber solids to non-rubber solids present in the bath.

A typical rubber latex was employed, containing:

59.40% water and ammonia
35.15% rubber hydrocarbon
5.45% non-rubber substance, including
    0.03% sediment
    2.04% acetone extractable solids
    2.65% water-soluble solids
    0.37% ash
    0.21% nitrogen This latex was put in a bath, and diluted to 30% non-volatile, and various fibrous materials (e. g. paper, cotton felt, wool felt, etc.) were passed through the bath and allowed to absorb the latex. In other cases, the latex was forced through the felt by pressure rollers. The fibrous material was squeezed off after coming out of the bath, and excess material returned to the bath.

In every instance, the composition of the bath changed in time, resulting in non-uniform impregnation. The serum resulting from coagulating the rubber in the latex was then added to the latex, to reestablish the ratio of rubber to non-rubber solids in the bath; impregnation again became satisfactory.

The serum components of rubber latex appear to act as surface active agents reducing the surface tension of the system. In a normal latex, the surface tension is usually in the range of 35 to 40 dynes per cm. During an impregnation operation of the type described above, in which an absorbent web is immersed in the latex followed by squeeze-rolls to remove excess fluid, the extraction of the water-soluble components proceeds at a greater rate than extraction of the rubber particles. The result is a gradual increase in the relative proportion of rubber to serum components as indicated by a corresponding increase in surface tension which has been observed to increase to values of the order of 50 dynes per cm. In many operations involving wetting of textile fibers, a bath of relatively high surface tension requires excessive wetting time or mechanical manipulation to effect proper penetration of the fabric or batting. Another disadvantage is that the relative content of serum ingredients in the saturated fabric is gradually decreased, while the rubber content is increased. The natural antioxidant, plasticizing, and other desirable properties of the serum components is accordingly lost.

The stability of a diluted latex bath is impaired by dilution, unless protective colloids are added. The serum components of latex which are stabilizers for the rubber particles are generally free from the objectionable effects of casein, glue, or starch additions.

The addition of skim latex can be combined, if desired, with surface active agents in order to obtain the greatest reduction in wetting time, as well as to produce a latex impregnated product of uniform character during the course of an extended, continuous operation on a web of material. Thus, 0.4% of Aquarex "D" (sodium salt of fatty alcohol sulfate) will improve impregnation in the above example.

In a manufacturing operation involving a web of batting or fabric, the impregnating time is a complex function of a series of factors including (1) length of saturating bath; (2) rate of web passage; (3) mechanical arrangements to carry the web; (4) squeeze-roll pressures. Control of such an operation is most conveniently effected by laboratory tests on small hand-saturated swatches of the material performed in such a manner that the number and sequence of samples can be related to the mechanical conditions imposed by commercial equipment. In order to control the uniformity of the bath in such an operation, I have found that samples taken at bath volume decrements of 5% are ordinarily frequent enough; and the amount of serum addition needed can be easily determined by surface tension or chemical measurements.

The invention is applicable to both natural and artificial latices of both natural and synthetic rubber, and may be applied to latices of various concentrations. It may be applied to any type of saturating equipment, and will be of use with all types of materials being impregnated.

I claim:

1. In the method of impregnating an absorbent material with a rubber derived from an aqueous latex where the absorbent material is passed through a bath of latex and removes a portion thereof, the improvement which comprises maintaining in the bath a substantially uniform ratio of rubber solids to non-rubber solids.

2. In the method of impregnating an absorbent material with a rubber derived from an aqueous latex where the absorbent material is passed through a bath of latex and removes a portion thereof, the improvement which comprises maintaining in the bath a substantially uniform ratio of rubber solids to non-rubber solids by the addition of materials present in the original latex to the bath as the impregnation progresses, in such proportions that the latex in the bath after such addition has the approximate constitution of the original latex.

3. In the method of impregnating an absorbent material with a rubber derived from an aqueous latex where the absorbent material is passed through a bath of latex and removes a portion thereof, the improvement which comprises maintaining in the bath a substantially uniform ratio of rubber solids to non-rubber solids by the addition to the bath of latex serum as the impregnation progresses.

EARL K. FISCHER.